United States Patent Office 3,161,962
Patented Dec. 22, 1964

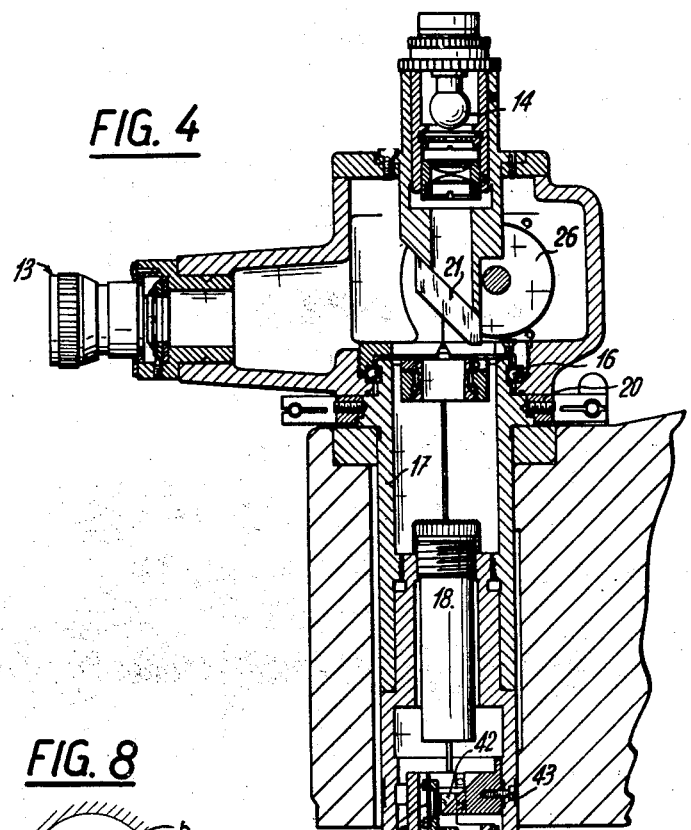
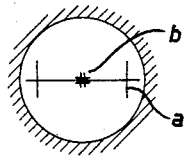
FIG. 4
FIG. 8

3,161,962
FEELER MICROSCOPE FOR MEASURING MACHINE
Jacques A. Pettavel and Andre H. Mottu, Geneva, Switzerland, assignors to Societe Genevoise d'Instruments de Physique, Geneva, Switzerland, a company of Switzerland
Filed Dec. 5, 1961, Ser. No. 157,062
Claims priority, application Switzerland, Dec. 14, 1960, 13,952/60
11 Claims. (Cl. 33—169)

Measuring machines are known which have a movable tool-holder which is provided with means for determining its position and on which is mounted a feeler adapted to bear with a predetermined pressure against the object to be measured. Feeler microscopes have also been constructed which permit observation of the axial or lateral displacement of the feeler against a resilient returning device, in such a manner as to cause this feeler to occupy a position corresponding exactly to a predetermined pressure; this pressure has to be always the same, so as to ensure accurate repetition of precise measurement. Microscopes for measuring in a transverse direction are provided with oscillating feelers, and microscopes for measuring in a vertical direction are provided with axially displaceable feelers. For measuring threads, microscopes are used which have an oscillating feeler which is also capable of any required vertical displacement permitting the end of the feeler to be located at the level of the bottom of a thread. Of course, these different microscopes may be interchanged in the tool holder of the measuring machine.

The present invention relates to a feeler microscope capable of being used for the three operations described above. This microscope is characterised in that this feeler is mounted on a carriage by means permitting resilient oscillation of the feeler from side to side about a horizontal axis, that this carriage is displaced vertically in the body of the microscope and is suspended from a regulable balancing device, that the member for determining the position of the feeler is provided with a reticule indicating on the one hand the transverse positions which this feeler has to occupy in order to act on the element, which is benig measured, with a predetermined pressure produced by the resilient mounting of this feeler, and on the other hand the vertical position which this feeler has to occupy so as to act on the element with a pressure given by the balancing device, and that, lastly, this balancing device can be adjusted in such a manner as to place the feeler in neutral vertical equilibrium to permit threads to be measured.

Figure 1:
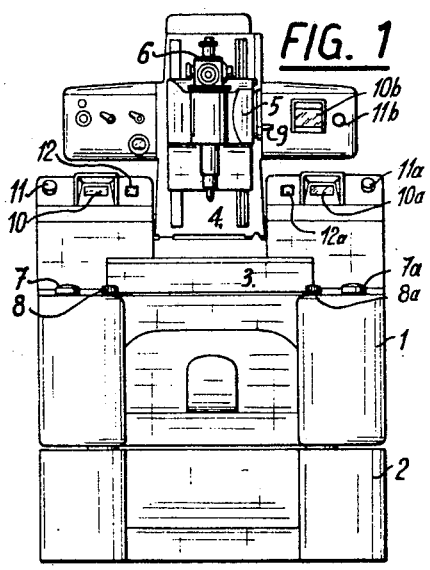
Figure 2:
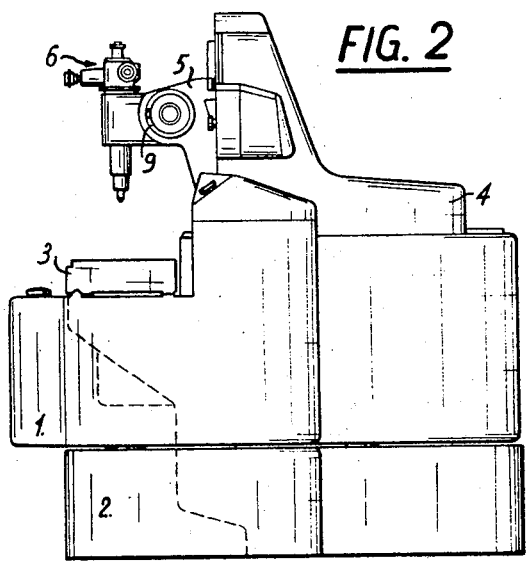
Figure 3:
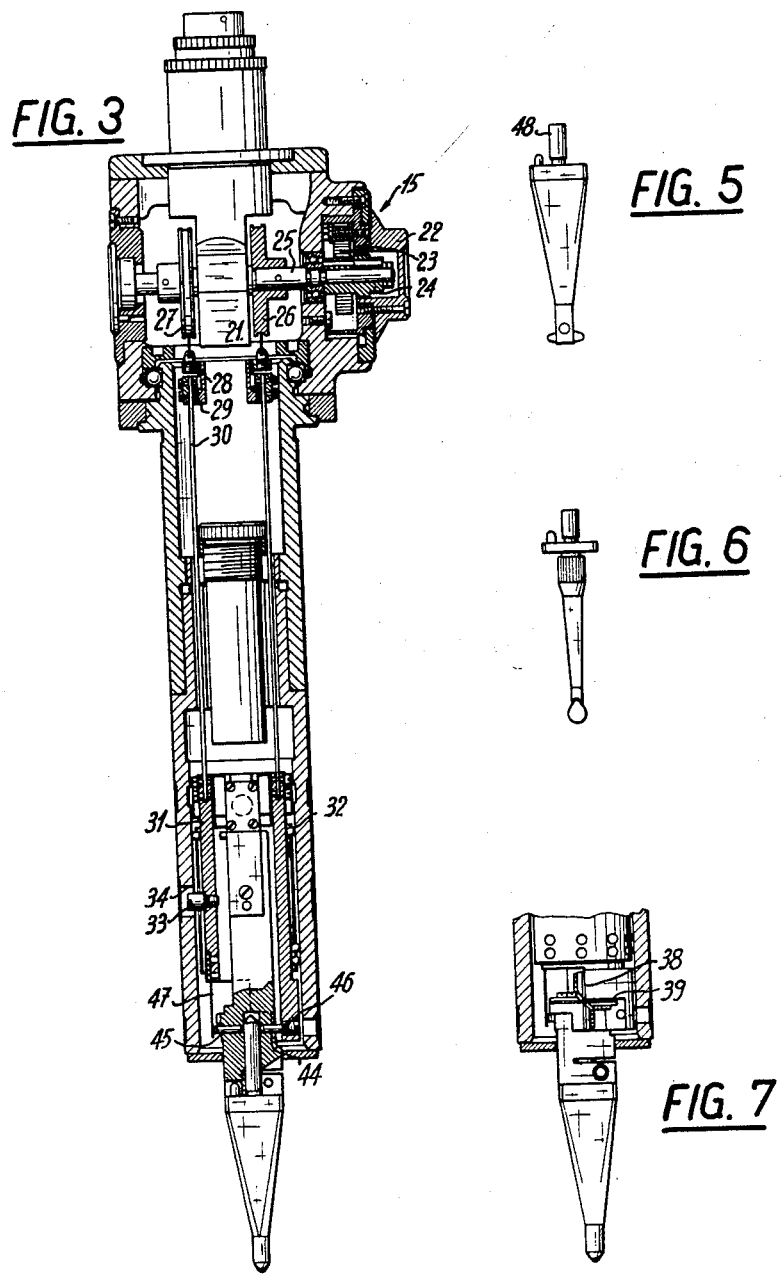

An embodiment of the invention chosen by way of example is illustrated in the accompanying drawings, in which:

FIGURES 1 and 2 are general views of a measuring machine provided with a feeler microscope constructed in accordance with the invention, FIGURES 3 and 4 show axial sections of this embodiment, and FIGURES 5, 6 and 7 show details, and FIGURE 8 shows the image of the reticule of the microscope.

The drawings illustrate a measuring machine of which the frame 1 is mounted at three points on a base 2. The front part of this frame supports a longitudinally slidable object-carrying table, 3, and a transversely displaceable slide 4 in its central part. This slide carries a vertically slidable tool-holder 5 on which a feeler microscope 6 is removably mounted. The table and the slide are both motor-driven; their rapid displacement is controlled by buttons 8 and 8a, respectively, and their slow movement is controlled by buttons 7 and 7a, respectively. 9 is a handle for vertically displacing the tool-holder.

The table, the slide and the tool-holder are each provided with a scale which is graduated in millimetres and of which the graduations are projected, by optical systems not shown in the drawing, on to screens 10, 10a, and 10b, respectively; indicators moving adjacent to these screens are manually controlled by means of micrometric drums 11, 11a and 11b and permit determination of the exact relative position of the graduations that are observed. Windows 12 and 12a permit observation of the centimeter graduation of rotary drums positively connected to the table and the slide respectively, indicating which graduation marking is the one appearing on the screen.

The feeler microscope comprises a head in which are mounted an eyepiece 13, a light source 14 and a balancing device 15. This head is mounted rotatably, through the intermediary of a bearing with balls 16, on a cylindrical body 17 removably mounted in an aperture in the tool-holder. An object lens system 18 is mounted in this body, and a feeler 19 is disposed at the end of the body. A ring 20 rigid with the body permits the body to be set in the required angular position with respect to the tool holder. 21 is a prism which permits the passage of the light beam from the source 14 towards the object lens system 18 and returns the image, observed through this object lens system, to the eyepiece.

The balancing device comprises a drum 22 of which the rotation, against sliding friction, permits adjustment of the tension of a spiral spring 23 which acts, through the intermediary of a tube 24, on a shaft 25 carrying two pulleys 26 one on each side of the prism 21. Two cables 27, which pass round these pulleys, are attached to a ring 28 which is mounted, through the intermediary of balls, in a second ring 29 to which two other cables 30 are attached. This arrangement permits rotation of the head of the microscope, and therefore rotation of the two cables 27, with respect to the cables 30 which are connected to the main body of the microscope.

The cables 30 secure a carriage 31 which is displaced vertically in the body of the bearing through the intermediary of balls 32. The movement of this carriage is limited by a screw 33 abutting against the two extremities of a groove 34 made in the body of the microscope.

The system 35 of the feeler is removably mounted by engaging, with a sliding fit, in an opening 36 of a support 37 which is itself mounted on the carriage by means of two pairs of resilient crossed blades 38 and 39. This resilient mounting permits the feeler to oscillate from side to side about a horizontal axis from a vertical position corresponding to the unstressed position of the two blades. The support 37 is provided with an arm 40 carrying at its end a reflecting plate 41 having a reticule a, c shown in FIGURE 8. This plate is disposed parallel to the plane of oscillation of the feeler, and is displaced in front of a prism 42 sending the image of the reticule a, c into the object lens system. An optical element of this system carries a reference reticule b.

For vertical measurements, the balancing drum is placed in a predetermined position (referred to for instance as 0) such that the horizontal marking of the reticule a is centered in the reticule b. In this position, the feeler acts with a predetermined pressure, for instance a pressure of 50 grammes, on the object to be measured. In order to prevent the feeler from oscillating, the stem 35 of the feeler is sufficiently long to radially displace two pins 44 and 45 of which the first bears against an adjustable abutment 46 of the slide whereas the second bears against a spring 47 rigidly attached to the same carriage 31.

For transverse measurements, a feeler (FIGURE 5) is used of which the stem 48 is sufficiently short not to actuate the pins 44 and 45. The balancing device is then moved (into a position referred to as 1 for instance) until such time as the carriage is in its extreme vertical position in which the screw 33 abuts against the top part of the groove 34. The feeler is then pressed laterally against the surface of the element to be measured, and is displaced against the action of the springs 38 and 39 until such time as one of the vertical markings on the reticule c is framed between the vertical markings of the reticule b. This position is of course adjusted so that the feeler acts wtih a predetermined pressure on the element to be measured.

Lastly, for measuring threads the drum of the balancing device is adjusted into a new position (referred to as 2 for instance) in which the slide is in neutral vertical equilibrium. The feeler (FIGURE 5) is then moved towards and against a thread and displaced, against the springs 38 and 39, until such time as one of the vertical markings is framed in the reticule b. The pressure of the feeler against the flank of the thread vertically displaces the feeler (which is in neutral equilibrium) until such time as the feeler has reached the bottom of the thread.

The present invention therefore has the advantage that measurements of depth and length and also measurements of threads can be carried out by means of the same feeler microscope, by choosing the appropriate type of feeler and regulating the tension of the balancing device 22.

We claim:

1. A feeler microscope comprising a cylindrical body, means supporting said body in an approximately vertical position, a head on the upper portion of said body, an optical system comprising an objective lens system mounted in said body and a microscope eyepiece mounted in said head, a carriage vertically displaceably in a lower portion of said body, a balancing device mounted in said head, means for suspending said carriage from said balancing device, a feeler support resiliently in said carriage for oscillation about a horizontal axis from a normal vertical position, a feeler carried by said support, visual position indicating means on said feeler support for indicating both the transverse position of the feeler with reference to said carriage and the vertical position of said carriage with reference to said body, said position indicating means being viewable through said optical system, means for illuminating said position indicating means, and said balancing device being selectively adjustable to provide a selected pressure of said feeler on a work piece and to place said feeler in neutral vertical equilibrium.

2. A microscope as claimed in claim 1, characterised in that the head of the microscope, which includes the balancing device, can pivot on the body of the microscope to permit orientation of the eyepiece, and that a bearing is interposed in the means for suspending the carriage from the balancing device to permit rotation of the carriage and the device relatively to one another.

3. A microscope as claimed in claim 2, characterised in that the bearing consists of a ring of balls.

4. A microscope as claimed in claim 1, characterised in that the balancing device comprises a spiral tension spring and a control drum of which the rotation permits the tension of the spiral spring to be adjusted.

5. A microscope as claimed in claim 4, characterised in that this spiral spring acts on a shaft carrying at least one pulley round which a suspension cable of the carriage passes.

6. A microscope as claimed in claim 1, characterised in that the carriage is mounted in the body of the microscope through the intermediary of balls permitting free movement of the carriage.

7. A microscope as claimed in claim 1, characterised in that the movement of the carriage is limited by abutment means, said balancing device being adjustable to hold said carriage against said abutment means and thereby immobilizing said carriage.

8. A microscope as claimed in claim 1, characterised in that the feeler support is mounted on the carriage through the intermediary of at least one pair of crossed resilient blades perpendicular to one another.

9. A microscope as claimed in claim 1, characterised in that the position indicating means comprises as a reflecting plate attached to the feeler support, said reflecting plate carrying a reticule and being disposed parallel to the plane of oscillation of the feeler.

10. A microscope as claimed in claim 1, characterised in that the feeler has a stem which is removably mounted in an opening formed in the support carrying the feeler.

11. A microscope as claimed in claim 1, characterised in that the bottom of this opening is provided with means blocking the oscillation of the feeler and controlled by the introduction of the stem of the feeler.

References Cited in the file of this patent

UNITED STATES PATENTS

| | | |
|---|---|---|
| 1,835,459 | Brittain | Dec. 8, 1931 |
| 2,307,950 | Plaut | Jan. 12, 1943 |
| 2,439,565 | Egor | Apr. 13, 1948 |
| 2,728,991 | Rinker | Jan. 3, 1956 |